United States Patent
Jung et al.

(10) Patent No.: US 10,326,890 B2
(45) Date of Patent: Jun. 18, 2019

(54) METHOD, SYSTEM AND APPARATUS FOR DATA SESSION MANAGEMENT IN CORE MOBILE NETWORKS

(71) Applicant: REDKNEE INC., Mississauga (CA)

(72) Inventors: Michael Jung, Berlin (DE); Jens Schendel, Berlin (DE)

(73) Assignee: REDKNEE INC., Mississauga (CA)

( * ) Notice: Subject to any disclaimer, the term of this patent is extended or adjusted under 35 U.S.C. 154(b) by 0 days.

(21) Appl. No.: 15/752,530

(22) PCT Filed: Aug. 13, 2015

(86) PCT No.: PCT/IB2015/056182
§ 371 (c)(1),
(2) Date: Feb. 13, 2018

(87) PCT Pub. No.: WO2017/025780
PCT Pub. Date: Feb. 16, 2017

(65) Prior Publication Data
US 2019/0014219 A1    Jan. 10, 2019

(51) Int. Cl.
*H04M 15/00*    (2006.01)
*H04W 4/24*    (2018.01)
(Continued)

(52) U.S. Cl.
CPC .... *H04M 15/8228* (2013.01); *H04L 12/1407* (2013.01); *H04L 67/146* (2013.01);
(Continued)

(58) Field of Classification Search
CPC .............. H04M 15/8228; H04M 15/66; H04L 12/1407; H04L 67/146; H04W 4/24; H04W 8/18
See application file for complete search history.

(56) References Cited

U.S. PATENT DOCUMENTS 8,995,305 B2    3/2015 Shaik et al.
2015/0113591 A1*    4/2015 Feng ................... H04L 63/0421
726/1
(Continued)

OTHER PUBLICATIONS

International Search Report dated Apr. 27, 2016 for International Application No. PCT/IB2015/056182.
(Continued)

*Primary Examiner* — Marcos L Torres

(74) *Attorney, Agent, or Firm* — Perry + Currier Inc.

(57) ABSTRACT

A charging server stores records corresponding to each of multiple subscriber identifiers associated with respective mobile devices. At least one record contains a counter value corresponding to one of multiple counter identifiers. The charging server receives a request from a policy server via a network, containing one of the subscriber identifirs and a session identifier. Responsive to receiving the request, the charging server determines whether the request includes any counter identifiers. When the request does not include any counter identifiers, the charging server determines whether the record corresponding to the received subscriber identifier contains any counter values. When the record includes at least one counter value, the charging server establishes a communications session with the policy server and transmits the at least one counter value to the policy server. When the record does not include any counter values, the charging server establishes a communications session with the policy server.

20 Claims, 4 Drawing Sheets

(51) Int. Cl.
    *H04W 8/18*   (2009.01)
    *H04L 12/14*  (2006.01)
    *H04L 29/08*  (2006.01)
(52) U.S. Cl.
    CPC ............ *H04M 15/66* (2013.01); *H04W 4/24* (2013.01); *H04W 8/18* (2013.01)

(56) References Cited

U.S. PATENT DOCUMENTS

2015/0213465 A1* 7/2015 Noyes ................... G06F 16/254
                                                                705/7.35
2015/0281467 A1* 10/2015 Chai ................... H04L 41/0893
                                                                455/406

OTHER PUBLICATIONS

Written Opinion dated Apr. 27, 2016 for International Application No. PCT/IB2015/056182.

* cited by examiner

METHOD, SYSTEM AND APPARATUS FOR DATA SESSION MANAGEMENT IN CORE MOBILE NETWORKS

FIELD

The specification relates generally to core mobile networks, and specifically to a method, system and apparatus for data session management between components of core mobile networks.

BACKGROUND

In mobile networks, such as those operating according to 3rd Generation Partnership Project (3GPP) standards, initiating communications between mobile devices and other computing devices, such as web servers in the Internet involves various interactions between components of the core mobile network. The core mobile network, for example, can include a policy component and a charging component. In order to set parameters for the communications between the mobile device and the above-mentioned web server, the policy component may be required to retrieve data relating to the subscriber operating that mobile device from the charging component.

In conventional core mobile networks, the policy component may send a request to the charging component without explicitly identifying which data is desired. The charging component may be able to respond to the request by providing the policy component with any available data relating to the mobile device. However, when no such data is currently available at the charging component, a failure state results, which can lead to disconnection of the mobile device and inefficient use of network resources as various network elements attempt to re-establish connections.

SUMMARY

A charging server in a network performs certain actions to manage the establishment of data sessions with a policy server in the network. The charging server stores records corresponding to each of multiple subscriber identifiers associated with respective mobile devices. At least one record contains a counter value corresponding to one of multiple counter identifiers. The charging server receives a request from a policy server via a network, containing one of the subscriber identifiers and a session identifier. Responsive to receiving the request, the charging server determines whether the request includes any counter identifiers. When the request does not include any counter identifiers, the charging server determines whether the record corresponding to the received subscriber identifier contains any counter values. When the record includes at least one counter value, the charging server establishes a communications session with the policy server and transmits the at least one counter value to the policy server.

When the record does not include any counter values, in some embodiments the charging server establishes a communications session with the policy server. In other embodiments, the charging server transmits an error message to the policy server without establishing a communications session with the policy server. The error message includes a re-trigger parameter for causing the policy server to send a further request.

BRIEF DESCRIPTIONS OF THE DRAWINGS

Embodiments are described with reference to the following figures, in which.

DETAILED DESCRIPTION OF THE EMBODIMENTS

Figure 1:
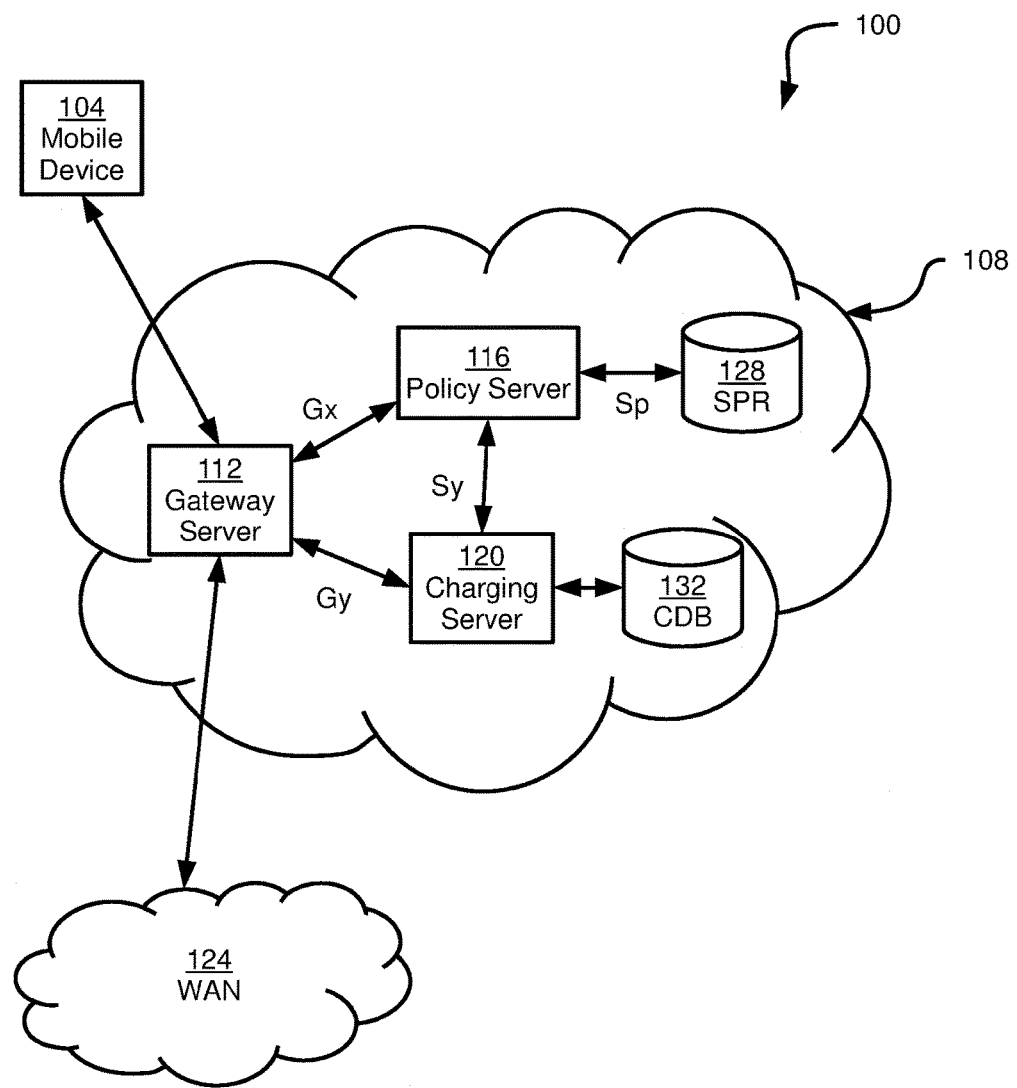
FIG. 1 depicts a communications system, according to a non-limiting embodiment.

FIG. 1 depicts a communications system 100. System 100 includes a mobile device 104, which can be any of a variety of mobile computing devices, including smart phones, cell phones, laptop computers and the like. Mobile device 104 therefore includes hardware components including a processing unit, one or both of volatile and non-volatile memory, network interfaces, input and output devices (e.g. any suitable combination of displays, speakers, microphones, touch screens, keyboards and the like). The processing unit of mobile device 104 executes programming instructions stored in memory (e.g. the above-mentioned non-volatile storage) for carrying out various functions, including the initiation of data communications over various networks. Multiple mobile devices may be included in system 100, but only mobile device 104 is shown for illustrative purposes.

Mobile device 104 is connected to a core mobile network 108. Core mobile network 108, also referred to herein as network 108, can be based on any suitable standard or combination of standards. In the present example, network 108 is an Evolved Packet Core (EPC) network structured according to the Long Term Evolution (LTE) standard set by the 3GPP. In other examples, however, network 108 can be structured according to a wide variety of other standards, such as the third Generation (3G) standard. The nature of the connection between mobile device 104 and core mobile network 108 is therefore variable, and is selected according to the implementation of core mobile network 108. In the present example, in which core mobile network 108 is an EPC network, the connection with mobile device 104 can be established through a conventional access network such as eNodeB.

Network 108 includes a gateway server 112, a policy server 116, and a charging server 120. In the present example, in which core network 108 is the LTE core network, it will be apparent to those skilled in the art that gateway server 112 is also referred to as a Packet Data Network Gateway (PDN Gateway or P-GW); policy server 116 is also referred to as a Policy and Charging Rules Function (PCRF); and charging server 120 is also referred to as an Online Charging System (OCS). Various features of a P-GW, PCRF and OCS will be known to those skilled in the art from published 3GPP specifications, including 3GPP Technical Specification (TS) 23.203. Certain features of policy server 116 and charging server 120, however, distinguish them from conventional policy and charging components (e.g. the PCRF and OCS specified by the 3GPP standards), as will be discussed herein.

Other elements of core mobile network 108 (such as a Mobility Management Entity, MME, a Home Subscriber Server, HSS, and one or more Serving Gateways, S-GW) can be implemented conventionally, and are therefore not shown herein for simplicity.

In general, core mobile network 108 allows mobile device 104 to gain access to other networks, including a wide area network (WAN) 124 such as the Internet. To access WAN 124, mobile device 104 contacts gateway server 112 (via other network elements such as the eNodeB access network, MME and S-GW mentioned above). Gateway server 112, in turn, contacts policy server 116 over a communications link based on the known Gx interface (a variant of the Diameter protocol) to obtain policy and charging control rules to be applied to the communications between mobile device 104 and WAN 124.

When the rules are received by gateway server 112 from policy server 116, gateway server 112 enforces those rules during communications between mobile device 104 and WAN 124. The rules can specify the quality of service (QoS) parameters to which mobile device 104 is entitled (e.g. bandwidth and latency parameters), usage limits, charging parameters and the like. In addition to enforcing the rules in connection with the access of WAN 124 by device 104, gateway server 112 can receive updated rules during the communications between device 104 and WAN 124, from policy server 116. During the communications initiated by device 104 (e.g. during the course of a web-browsing session initiated by device 104), gateway server 112 can also transmit usage data (e.g. what volume of data has been carried between mobile device 104 and WAN 124 during the web browsing session) to charging server 120 (e.g. over the Gy interface, another variant of the Diameter protocol).

Policy server 116 is configured to generate the above-mentioned rules based on information received from several elements of network 108. Such information can include data received from gateway server 112, such as a subscriber identifier (e.g. a Mobile Station International Subscriber Directory Number (MSISDN), International Mobile Subscriber Identity (IMSI), or the like) and a service type identifier corresponding to the type of data traffic requested by mobile device 104. The above-mentioned subscriber identifier can also indirectly identify mobile device 104 itself, as the subscriber identifier is generally stored on removable computer-readable storage media such as a Subscriber Identity Module (SIM) card housed within mobile device 104. Although such modules can be removed from one mobile device and placed in another (thus associating the subscriber identifier with a different mobile device), in the discussion herein it will be assumed that a single subscriber identifier remains associated with mobile device 104. Thus, the subscriber identifier may also be referred to as an identifier of mobile device 104.

The information received by policy server 116 can also include data retrieved by policy server 116 from a Subscriber Profile Repository (SPR) database 128. SPR 128 can be stored locally at policy server 116, or can be accessed by policy server 116 over a communications link based on the known Sp interface (see 3GPP Technical Specification 23.203). SPR 128 stores subscription records corresponding to mobile device 104, including indications of permitted service types, usage limits (e.g. the maximum monthly volume of data that mobile device 104 is permitted to retrieve from WAN 124), and the like.

The information received by policy server 116 and employed by policy server 116 in the generation of rules for deployment to gateway server 112 can also include data received from an application function (AF), not shown in FIG. 1. The AF can reside in WAN 124, and can correspond to the device to which mobile device 104 has requested access.

Further, the information received and employed by policy server 116 in the generation of rules can include data received from charging server 120. Charging server 120 maintains a charging database (CDB) 132, in which the above-mentioned usage data from gateway server 112 is stored. CDB 132 also stores charging related information associated with mobile device 104, such as an account balance and rating information (e.g. how much the operator of mobile device 104 must pay for certain volumes of data, certain service types, and the like). In addition, charging server 120 can determine monetary values for the usage data and deduct those values from the account balance in CDB 132 associated with mobile device 104.

Further, CDB 132 can contain counters (also referred to as policy counters) corresponding to a subscriber identifier associated with mobile device 104. The counters, examples of which will be discussed further below, can track a variety of usage-related data corresponding to the subscriber identifier. Charging server 120 be configured to update the counters in response to data received from gateway server 112 (e.g. data indicating that mobile device 104 has downloaded a certain volume of data from WAN 124). Policy server 116 can be configured to transmit a request, for example over the Sy interface defined by 3GPP TS 29.219, to charging server 120 in order to retrieve one or more of the above-mentioned counters for mobile device 104. CDB 132 can also contain information not directly related to usage monitoring (e.g. an indication that the subscriber identifier associated with device 104 is entitled to a time-limited elevated QoS level). Policy server 116 can be configured to generate or update the above-mentioned rules based in part on these counters. For example, policy server 116 may be configured to alter the bandwidth available to mobile device 104 (by providing an updated rule to gateway server 112) once mobile device 104 has exchanged a volume of data with WAN 124 that exceeds a predetermined monetary cost.

Various mechanisms are provided for policy server 116 to obtain the counters stored in CDB 132 for use in rule generation or updates. For example, policy server 116 can send a request to charging server 120 explicitly identifying one or more counters. Charging server 120 can be configured to respond to such a request by retrieving the identified counters (if they are available) and transmitting the counters to policy server 116. Such requests and responses may also result in the establishment of an Sy session between policy server 116 and charging server 120. In brief, a session established between policy server 116 and charging server 120 permits one or both of policy server 116 and charging server 120 to maintain state information in memory 204 or 254 in connection with that session, and to automatically perform various actions based on that state information. Subsequent requests and responses between policy server 116 and charging server 120 associated with mobile device 104 can therefore include a previously selected session identifier, and need not be preceded by session establishment negotiations.

In some implementations, policy server 116 can be configured to send a request to charging server 120 that does not identify any counters. In such implementations, charging server 120 is configured to retrieve all available counters corresponding to the subscriber identifier associated with mobile device 104 and transmit the identifiers and corresponding values of those counters to policy server 116. However, when no counters are available for mobile device 104 (e.g. because charging server 120 has not yet received usage data corresponding to mobile device 104 from gateway server 112), conventional charging servers are configured (per 3GPP TS 29.219, in particular section 4.5.1.3) to return an error code to policy server 116 (e.g. the code "DIAMETER_ERROR_UNKNOWN_POLICY_COUNTERS"), and to abort the establishment of an Sy session. As will be seen below, charging server 120 and policy server 116 include non-conventional features related to the management of Sy sessions under the above conditions.

Before discussing the operation of policy server 116 and charging server 120 in detail, a brief description of the internal components of policy server 116 and charging server 120 will be provided.

Figure 2:
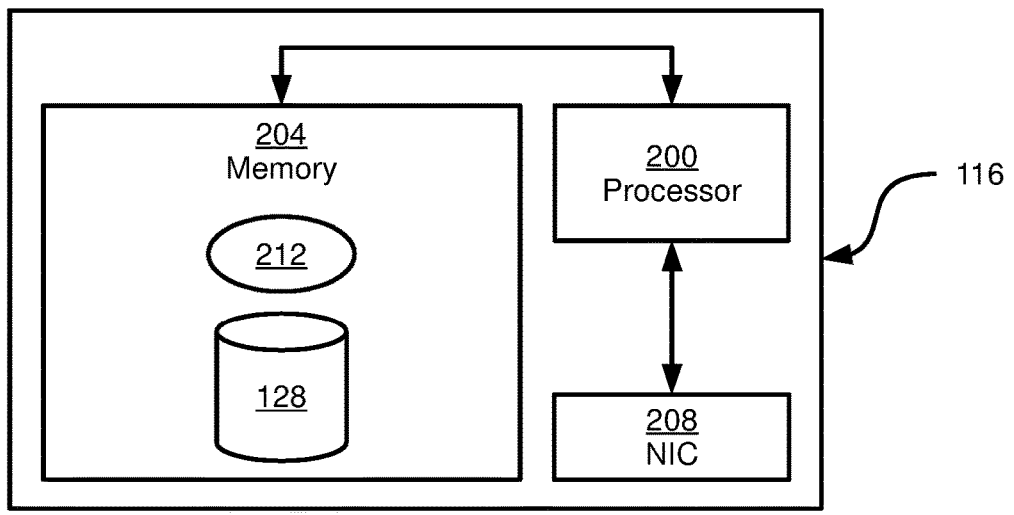
FIG. 2 depicts schematic diagrams of certain internal components of the policy server and the charging server of FIG. 1, according to a non-limiting embodiment.
Figure 2:
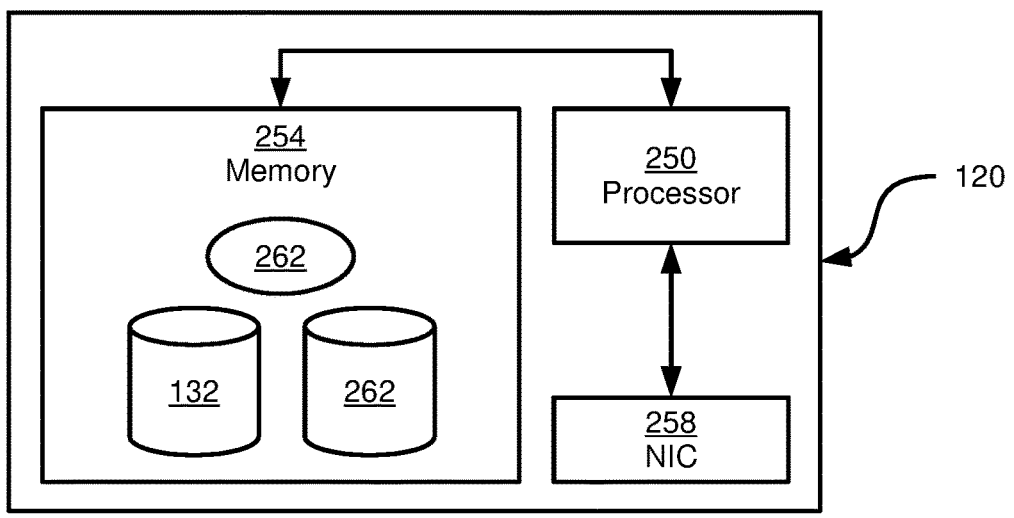

Turning to FIG. 2, policy server 116 and charging server 120 include respective central processing units (CPUs), or processors, 200 and 250. Processors 200 and 250 are interconnected with respective memories 204 and 254, as well as respective network interfaces 208 and 258. Processors 200, 250 and memories 204, 254 are generally comprised of one or more integrated circuits (ICs), and can have a variety of structures, as will now occur to those skilled in the art (for example, more than one CPU can be provided). Memories 204 and 254 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Network interfaces 208, 258 can be network interface controllers (NIC) that allow policy server 116 and charging server 120 to connect to each other and other computing devices (e.g. gateway server 112). Policy server 116 and charging server 120 can also each include input and output devices, such as keyboards, mice, displays, and the like (not shown).

Memories 204 and 254 store a plurality of computer-readable programming instructions, executable by processors 200 and 250, respectively, in the form of various applications. As will be understood by those skilled in the art, processors 200 and 250 can execute the instructions of or more such applications in order to perform various actions defined within the instructions. In the description below, processors 200 and 250 or more generally policy server 116 and charging server 120 are said to be "configured to" perform certain functions. It will be understood that they are so configured via the execution of the instructions of the applications stored in memories 204 and 250.

Among the applications stored in memory 204 is a policy application 212, which is executable by processor 200 to perform various actions described herein. Memory 204, in the present example, can also store SPR 128 (though as noted earlier, in other embodiments SPR 128 can be hosted at another computing device). At charging server 120, meanwhile, a charging application 262 is stored in memory 254, and is executable by processor 250 to perform various actions described herein. Memory 254 also stores CDB 132, as mentioned earlier. In addition, memory 254 can store a session database 262, which will be discussed in greater detail below.

An example of the contents of CDB 132 is shown below in Table 1, which will be referred to in the following description of the actions taken by policy server 216 and charging server 220.

TABLE 1

Example Charging Database 132

| | | Subscriber ID | | |
|---|---|---|---|---|
| Counter Name | Counter ID | 104 | ABC | ... |
| Account balance | — | $15.40 | $5.20 | ... |
| Monthly usage counter | 1 | 5 MB | | ... |
| Session 1 usage counter | 2 | 0 MB | | ... |
| Session 1 spending counter | 3 | 0$ | | ... |
| Session 1 QoS status | 4 | Low | | ... |

In the above example, CDB 132 includes two records, each corresponding to a different subscriber (and thus to a different associated mobile device). The first record includes the subscriber identifier "104", and corresponds to mobile device 104 (it will be appreciated that the subscriber identifier can take various forms, including a MSISDN, an IMSI, and the like). Each record of CDB 132 also includes a plurality of fields corresponding to the subscriber identified by that record.

The fields include data such as a prepaid account balance, and can also include other data (not shown), such as rating parameters to determine the monetary cost of data volumes consumed by the mobile device. In addition, each record of CDB 132 can include one or more counters corresponding to the identified subscriber. Thus, the record of Table 1 corresponding to the subscriber ID "104" (associated with device 104) includes a monthly usage counter containing the volume of data mobile device 104 has exchanged with WAN 124 in the previous month. CDB 132 can also contain at least one session-specific usage counter, containing the volume of data that mobile device 104 has exchanged with WAN 124 in a particular session (e.g. a single VoIP call). CDB 132 may contain multiple session-specific counters, since mobile device 2104 can initiate multiple communication sessions with WAN 124. Only one set of session-specific attributes is shown above for simplicity.

In addition, the counters stored in CDB 132 can include a session-specific spending counter containing the monetary value, as determined by charging server 120, of the data exchanged between mobile device 104 and WAN 124 in a particular communication session; and a status attribute for the above-mentioned monetary value counter. The status attribute can be determined by charging server 120, based on whether the spending counter has surpassed various predefined thresholds defined in application 262 or in other fields of CDB 132.

A second example record is also shown in Table 1, for the subscriber identifier "ABC", corresponding to a device other than device 104. As seen in Table, 1 no counters are currently available in CDB 132 for subscriber ABC. This may be because charging server 120 has not yet received usage data from gateway server 112 corresponding to a mobile device associated with the subscriber identifier "ABC". As mentioned above, one or both of policy server 116 and charging server 120 are configured to perform certain actions to manage Sy session establishment when no counters are available for a given subscriber identifier in CDB 132. Those actions will be described below in greater detail.

Figure 3:
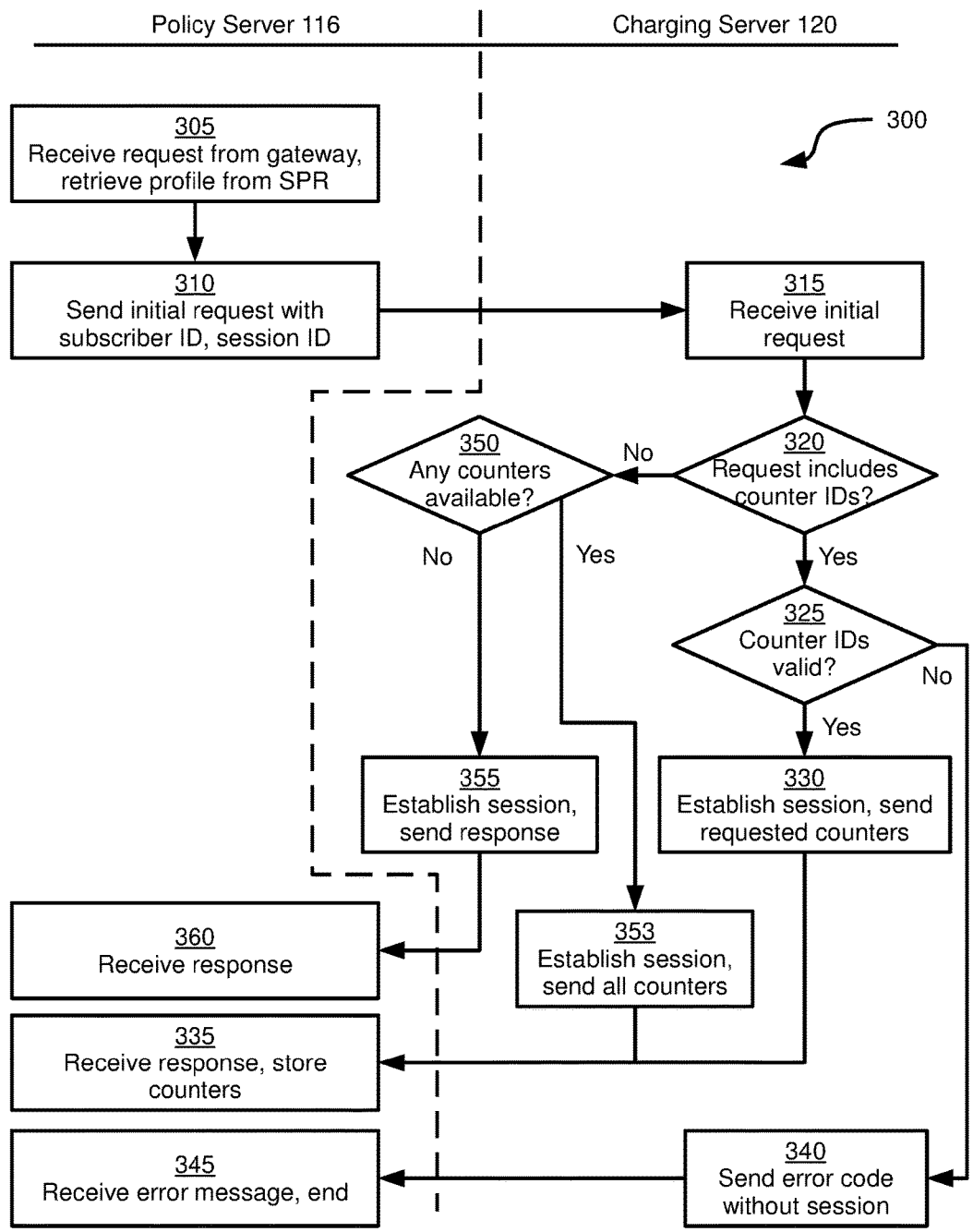
FIG. 3 depicts a method of data session management in the system of FIG. 1, according to a non-limiting embodiment.

Referring now to FIG. 3, a method 300 of data session management in core mobile networks is depicted. The performance of method 300 will be described in connection with its performance in system 100, and particularly by policy server 116 and charging server 120. However, it will be apparent to those skilled in the art that method 300 can also be implemented in other suitable systems. The blocks of method 300 are divided by a dashed line in FIG. 3, indicating that a portion of method 300 is performed by policy server 116, and that the other portion is performed by charging server 120. The blocks of method 300 are performed by the above-mentioned servers via the execution of applications 212 and 262, respectively, by processors 200 and 250, respectively.

Beginning at block 305, policy server 116 is configured to receive a request from gateway server 112 to permit access to WAN 124 by a mobile device, such as device 104. The request received at block 305 includes a subscriber identifier (associated with a device, such as mobile device 104), and can also include other data (for instance, an identifier of the type of data that device 104 is attempting to exchange with WAN 124). Policy server 116 is configured, in response to the request received at block 305, to retrieve a profile corresponding to the subscriber identifier from SPR 128.

Following the receipt of the request at block 305, at block 310 policy server 116 is configured to transmit an initial request including the subscriber identifier to charging server 120. The initial request, as noted above, can also include zero or more identifiers of counters stored in CDB 132. In the present implementation, the initial request is structured according to the Sy protocol, and thus includes a Spending Limit Request (SLR) message containing a request type parameter having the value "INITIAL" (to indicate that this request is not associated with an existing session). The initial request also includes a session identifier generated by policy server 116. The session identifier can be generated according to any of a variety of conventional identifier generation mechanisms. The session identifier can include any suitable alphanumeric string serving to distinguish a subset of the messages exchanged by policy server 116 and charging server 120 from other messages exchanged by policy server 116 and charging server 120, as will be seen below.

At block 315, charging server 120 is configured to receive the initial request sent via network 108 by policy server 116. Having received the initial request, charging server 120 is configured to determine, at block 320, whether the initial request includes any counter identifiers.

When the determination at block 320 is affirmative (that is, when the request from policy server 116 includes at least one counter identifier), charging server 120 proceeds to block 325, at which charging server 120 is configured to determine whether the counter identifier (or multiple counter identifiers, if applicable) in the request from policy server 116 are valid. The determination at block 325 can include one or both of determining whether the counter identifiers are known to charging server 120, and determining whether the counter identifiers are available in CDB 132 for the subscriber identified in the request from policy server 116.

For example, assuming CDB 132 has the contents shown in Table 1, if the request received at block 315 included the subscriber identifier "104" associated with mobile device 104 and an identifier of the "monthly usage" counter (e.g. the counter ID "1"), the determination at block 325 would be affirmative, because the monthly usage counter corresponding to device 104 shown in Table 1 is both known to charging server 120, and is available for the subscriber identifier "104". In other words, CDB 132 contains a value (specifically, a value of 5 MB in the present example) corresponding to the requested subscriber identifier for the requested counter identifier. On the other hand, if the request received at block 315 identified device ABC and the monthly usage counter, the determination at block 325 may be negative, because the record of CDB 132 corresponding to device ABC contains no value for the monthly usage counter.

When the determination at block 325 is affirmative, charging server 120 proceeds to block 330, at which charging server 120 establishes a communications session with policy server 116 and retrieves the requested counters from CDB 132 for transmission to policy server 116. Charging server 120 is configured to establish the above-mentioned session by storing the session identifier received from policy server 116 in session database 262. The session identifier is also included in the message transmitted to policy server 116 containing the requested counters.

Table 2 shows an example of session database 262 following the performance of block 330.

TABLE 2

Example Session Database 262

| Session ID | Subscriber ID | Subscribed Counter IDs |
|---|---|---|
| 116-1 | 104 | 1 |

In the example shown above, the session identifier received at charging server 120 from policy server 116 is "116-1". As noted previously, a wide variety of session identifiers can be generated by policy server 116. Session database 262 also identifies, in connection with the session identifier, a subscriber identifier to which the session relates. Further, session database 262 can contain a counter identifier corresponding to the session identifier. In particular, charging server 120 is configured to store the identifier of the counter (or counters) requested by policy server 116. The storage of such counter identifiers in connection with the session identifier permits charging server 120 to implement functionality such as automatically notifying policy server 116 of any changes to the value of the identified counter corresponding to the identified subscriber in CDB 132. Such functionality is described in 3GPP TS 29.219.

The message sent by charging server 120 to policy server 116 at block 330 can include, in the present implementation, a Spending Limit Answer (SLA) message containing the session identifier and a result code (RC), such as "SUCCESS" indicating that the session has been successfully established. The SLA message can also contain at least one attribute-value pair (AVP) corresponding to the counters requested by policy server 116. Each AVP includes an identifier of the requested counter, and a value of the requested counter.

At block 335, policy server 335 is configured to receive and store the counters received from charging server 120. Policy server 116 can then proceed to generate rules for the data session between device 104 and WAN 124. Subsequently (not shown in FIG. 3), policy server 116 can be configured to send further messages to charging server 120, including the session identifier originally sent to charging server 120 at block 310, to request further counters, updates to the notification settings stored in session database 262, and the like (see 3GPP TS 29.219).

When the determination at block 325 is negative, the performance of method 300 proceeds instead to block 340, at which charging server 120 is configured to send a response to policy server 116 indicating that no session has been established. For example, in the present embodiment the message sent at block 340 is an SLA message including the error result code "DIAMETER_ERROR_UNKNOWN_POLICY_COUNTERS", indicating that the counters requested by policy server 116 are not recognized by charging server 120. At block 340, charging server 120 does not store the session identifier received from policy server 116 in session database 262, and functionality such as the above-mentioned automatic counter updates to policy server 116 is not available.

At block 345, policy server 116 is configured to receive the message containing the error code, and the performance of method 300 ends. Policy server 116, in some embodiments, may be configured to terminate a session previously established between policy server 116 and gateway server 112. That termination, in turn, may cause gateway server 112 to prevent access to WAN 124 by device 104. Policy server 116 may also be configured, either automatically or in response to a repeated attempt by device 104 to access WAN 124 (that is, following a repeated performance of block 305, to repeat the performance of block 310.

Returning to block 320, in response to a negative determination—that is, a determination that the initial request received from policy server 116 does not contain any counter identifiers—charging server 120 is configured to proceed to block 350 rather than to block 325. At block 350, charging server 120 is configured to determine whether any counters are available in CDB 132 that correspond to the subscriber identifier in the request received from policy server 116. For example, if the request from policy server 116 included the subscriber identifier "104", corresponding to mobile device 104, at block 350 the determination is affirmative, since CDB 132 contains values corresponding to the subscriber identifier "104" as shown in Table 1. In such an example, charging server 120 would proceed to block 353.

At block 353, charging server 120 is configured to store the session identifier received from policy server 116 at block 315 in database 262 along with identifiers of all available counters (as opposed to those specifically identified, as discussed earlier) for the subscriber identified in the request received at block 315. Charging server 120 is then configured to transmit a message (such as an SLA message) to policy server 116 including an indication that a session has been successfully established, and AVPs for each available counter in CDB 132 corresponding to the subscriber identifier "104".

In another example, however, the request from policy server 116 (received at block 315) may include the subscriber identifier "ABC" instead of "104". As seen in Table 1, CDB 132 does not contain any counter values corresponding to subscriber ABC. The determination at block 350 is therefore negative, and charging server 120 proceeds to block 355 instead of block 353.

At block 355—in contrast with conventional systems in which an error would be returned to policy server 116, and no session would be established—charging server 120 establishes a communication session with policy server 116 by storing the session identifier received at block 315 in session database 262 (as described in connection with block 330). In contrast to the performance of block 330, however, charging server 120 does not store any counter identifiers in session database 262 in connection with the session identifier stored at block 355. The storage of the session identifier in session database 262 permits counter identifiers to be added to the session at a later time. For example, after the performance of block 355, charging server 120 can be configured to monitor CDB 132 for any changes to the counters corresponding to devices identified in session records in database 262. When any changes are detected—for example, when a counter becomes available that was not previously available—charging server 120 can be configured to automatically notify policy server 116 of the status of that counter, via a message including the counter identifier, the counter's value, and the session identifier.

At block 360, policy server 116 is configured to receive the message sent by charging server 120 at block 355. Policy server 116 can be configured, following the performance of block 360, to proceed with the generation of rules for access to WAN 124 by device 104, as well as to transmit further requests for counters and counter notifications to charging server 120. Such requests include the above-mentioned session identifier, allowing charging server 120 to update database 262.

Various implementations are contemplated for the response sent by charging server 120 to policy server 116 at block 355. In some embodiments, the response can be an SLA message containing a result code indicating that the session has been successfully established. In other words, the message sent by charging server 120 at block 355 in this embodiment includes no counter data.

In other embodiments, however, charging server 120 can be configured to include counter data in the message sent at block 355, despite the absence of available counters for subscriber ABC. In particular, memory 254 can store default, or dummy, counter data. Table 3 shows an updated version of the example of Table 1, illustrating a possible storage location for the default counter.

TABLE 3

Example Charging Database 132

| | | Subscriber ID | | |
|---|---|---|---|---|
| Counter Name | Counter ID | 104 | ABC | ... |
| Account balance | — | $15.40 | $5.20 | ... |
| Monthly usage counter | 1 | 5 MB | | ... |
| Session 1 usage counter | 2 | 0 MB | | ... |
| Session 1 spending counter | 3 | 0$ | | ... |
| Session 1 QoS status | 4 | Low | | ... |
| Default Counter | 5 | dummy | dummy | dummy |

As seen above, CDB 132 includes counter data for a counter with the name "default counter", the counter identifier "5" and the value "dummy". A wide variety of default counter identifiers and values will occur to those skilled in the art. In general, the default counter is any suitable value provided for use when no other counters are available. That is, charging server 120 can be configured to automatically populate CDB 132 with default counters as shown above. In the example shown in Table 3, each subscriber record includes a default counter. In other embodiments, a single default counter can be stored in memory 254 (whether in CDB 132 or elsewhere) that is common to all subscriber identifiers.

Charging server 120 can be configured, at block 355, to retrieve the default counter and include the default counter AVP (that is, the identifier and value of the default counter)

in the message returned to policy server 116. Policy server 116, in turn, is configured to ignore any counter data received from charging server 120 that policy server 116 does not recognize. Thus, policy server 116 can store a list of known counter identifiers that does not include the above-mentioned default counter. Upon receiving the message including the default counter, therefore, policy server 116 can be configured to discard the default counter.

Thus, as discussed above, charging server 120 performs various actions that result in the establishment of a communications session (e.g. an Sy session) with policy server 116, even in the absence of counter identifiers in the initial request from policy server 116 coupled with the absence of counter data for the subscriber identified in the initial request.

Figure 4:
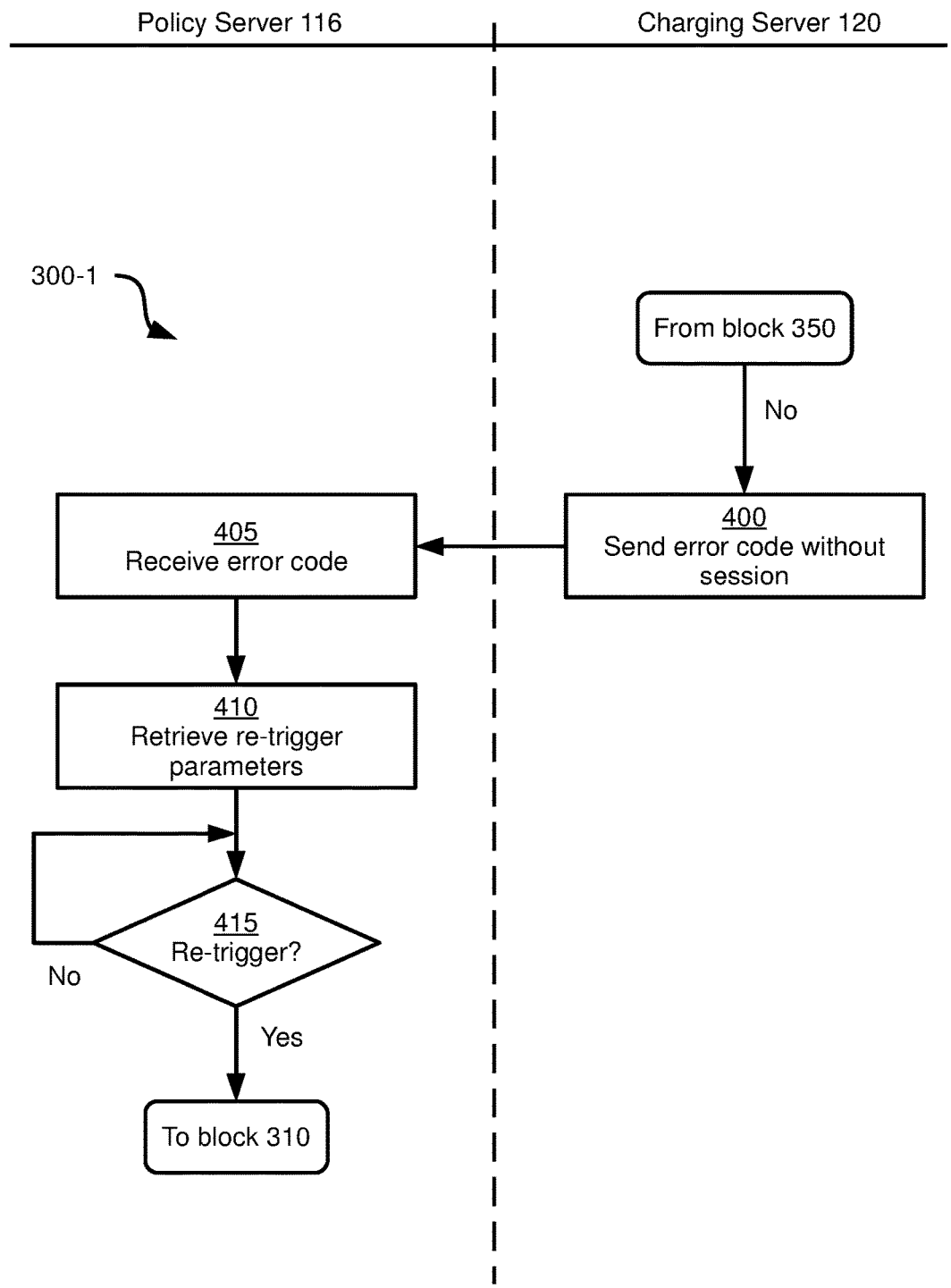
FIG. 4 depicts a method of data session management in the system of FIG. 1, according to another non-limiting embodiment.

Turning now to FIG. 4, another embodiment of method 300 is illustrated, in the form of a method 300-1. Method 300-1 includes blocks 305 to 345 as described above in connection with FIG. 3. However, following a negative determination at block 350—that is, when policy server 116 has sent a request to charging server at block 310 that does not identify any counters, and when no counters are available in CBD 132 for the subscriber identified in the request from policy server 116—charging server 120 does not establish a session with policy server 116, as described earlier.

Instead, at block 400, charging server 120 is configured to transmit a message indicating that no session has been established. For example, the message can be an SLA message including the above-mentioned error result code "DIAMETER_ERROR_NO_AVAILABLE_POLICY_COUNTERS".

At block 405, policy server 116 is configured to receive the error code. However, in contrast to method 300, which terminates at block 345 (the receipt of an error code by policy server 116), the performance of method 300-1 does not terminate at block 405.

At block 410, policy server 116 is configured to retrieve one or more re-trigger parameters. The parameters can be preconfigured parameters retrieved from memory 204. In other embodiments, the parameters can be received from charging server 120, for example in the message received at block 405. In such embodiments, it will now be apparent that charging server 120 is additionally configured, at block 400, to retrieve the re-trigger parameters from memory 254 for transmission with the error code message.

In general, the above-mentioned re-trigger parameters define at least one condition under which policy server 116 repeats the performance of block 310 in connection with the same device (and indeed, the same attempt to access WAN 124 by that device) identified in the request sent at the original performance of block 310.

The re-trigger parameters can therefore include any one of, or any suitable combination of, a time period, and one or more network events (e.g. modifications to the communication session established between device 104 and gateway server 112, receipt by policy server 116 of data from another network element, such as an application function, AF, and the like). Thus, in some embodiments, at block 400 charging server 120 can be configured to transmit an SLA message containing the above-mentioned error code as well as a re-trigger parameter. For example, the re-trigger parameter can be sent as an AVP having the identifier "RevalidationTime" and a value indicating a time period (e.g. five minutes).

At block 415, having retrieved the re-trigger parameters from memory 204 or from the message received at block 405, policy server 116 is configured to determine, based on the re-trigger parameters, whether to send another request as described in connection with block 310. For clarity, it is noted that the additional request relates to the same device as the initial performance of block 310. It will be understood that during any given performance of method 300 or 300-1 for a particular device, policy server 116 can simultaneously perform other instances of methods 300 or 300-1 for a wide variety of other devices. The repetition of block 310 relates to a single instance.

Thus, for example, the determination at block 415 can include determining whether the time elapsed since the request at block 310 was sent (or, in other embodiments, the time elapsed since the error code was received at block 405) exceeds a re-trigger parameter defining a time period. When the determination is negative, policy server 116 is configured to repeat the determination, without repeating the performance of block 310. When the determination is affirmative, however, policy server 116 is configured to proceed to block 310, and resume the performance of method 300 as described above.

Various advantages to the above systems and methods will now be apparent to those skilled in the art. For example, by establishing a session even after a negative determination at block 350, charging server 120 enables the automatic provision of counter update notifications to policy server 116 (which generally would not be possible without an established session). The establishment of a session, or the use of re-trigger parameters to control the repetition of requests at block 310, may also reduce or eliminate the need for policy server 116 to repeatedly (in some cases at high frequencies) query charging server 120 for counter data that is not available.

The scope of the claims should not be limited by the embodiments set forth in the above examples, but should be given the broadest interpretation consistent with the description as a whole.

We claim:

1. A method of data session management in a charging server having a memory, a processor and a network interface connecting the charging server to a network, the method comprising:

storing, in the memory, respective records corresponding to each of a plurality of subscriber identifiers associated with respective mobile devices;

at least one of the records containing a counter value corresponding to one of a plurality of counter identifiers;

receiving a request from a policy server via the network, the request containing one of the plurality of subscriber identifiers and a session identifier;

responsive to receiving the request, determining whether the request includes any of the counter identifiers;

when the request does not include any of the counter identifiers, determining whether the one of the records corresponding to the one of the subscriber identifiers contains any counter values, and in response:

when the one of the records includes at least one counter value, establishing a communications session with the policy server and transmitting the at least one counter value to the policy server; and when the one of the records does not include any counter values, establishing a communications session with the policy server.

2. The method of claim 1, wherein establishing the communications session comprises storing the session identifier in the memory in association with the one of the subscriber identifiers.

3. The method of claim 2, wherein establishing the communications session further comprises sending, to the policy server, an indication that a session having the session identifier has successfully been established.

4. The method of claim 3, further comprising:
storing a default counter in the memory;
retrieving the default counter from the memory and sending the default counter to the policy server.

5. The method of claim 4, wherein storing the default counter comprises storing respective default counters in each of the records in the memory.

6. The method of claim 4, wherein storing the default counter comprises storing a single default counter in the memory.

7. The method of claim 3, further comprising sending the indication without any counter data.

8. The method of claim 2, further comprising:
repeating the determination of whether the one of the records corresponding to the one of the subscriber identifiers contains any counter values; and
when the determination is affirmative, automatically sending the counter values to the policy server.

9. A method of data session management in a charging server having a memory, a processor and a network interface connecting the charging server to a network, the method comprising:
storing, in the memory, respective records corresponding to each of a plurality of subscriber identifiers associated with respective mobile devices;
at least one of the records containing a counter value corresponding to one of a plurality of counter identifiers;
receiving a request from a policy server via the network, the request containing one of the plurality of subscriber identifiers and a session identifier;
responsive to receiving the request, determining whether the request includes any of the counter identifiers;
when the request does not include any of the counter identifiers, determining whether the one of the records corresponding to the one of the subscriber identifiers contains any counter values, and in response:
when the one of the records includes at least one counter value, establishing a communications session with the policy server and transmitting the at least one counter value to the policy server; and
when the one of the records does not include any counter values, transmitting an error message to the policy server without establishing a communications session with the policy server; the error message including a re-trigger parameter for causing the policy server to send a further request.

10. The method of claim 9, the re-trigger parameter including at least one of a time period and a network event.

11. A charging server, comprising:
a memory storing respective records corresponding to each of a plurality of subscriber identifiers associated with respective mobile devices; at least one of the records containing a counter value corresponding to one of a plurality of counter identifiers;
a network interface connecting the charging server to a network; and
a processor interconnected with the memory and the network interface;
the processor configured to:
receive a request from a policy server via the network, the request containing one of the plurality of subscriber identifiers and a session identifier;
responsive to receiving the request, determine whether the request includes any of the counter identifiers;
when the request does not include any of the counter identifiers, determine whether the one of the records corresponding to the one of the subscriber identifiers contains any counter values, and in response:
when the one of the records includes at least one counter value, establish a communications session with the policy server and transmit the at least one counter value to the policy server; and
when the one of the records does not include any counter values, establish a communications session with the policy server.

12. The charging server of claim 11, the processor configured to establish the communications session by storing the session identifier in the memory in association with the one of the subscriber identifiers.

13. The charging server of claim 12, the processor further configured to establish the communications session by sending, to the policy server, an indication that a session having the session identifier has successfully been established.

14. The charging server of claim 13, the processor further configured to:
store a default counter in the memory;
retrieve the default counter from the memory and send the default counter to the policy server.

15. The charging server of claim 14, the processor configured to store the default counter by storing respective default counters in each of the records in the memory.

16. The charging server of claim 14, the processor configured to store the default counter by storing a single default counter in the memory.

17. The charging server of claim 13, the processor further configured to send the indication without any counter data.

18. The charging server of claim 12, the processor further configured to:
repeat the determination of whether the one of the records corresponding to the one of the subscriber identifiers contains any counter values; and
when the determination is affirmative, automatically send the counter values to the policy server.

19. A charging server, comprising:
a memory storing respective records corresponding to each of a plurality of subscriber identifiers associated with respective mobile devices; at least one of the records containing a counter value corresponding to one of a plurality of counter identifiers;
a network interface connecting the charging server to a network; and
a processor interconnected with the memory and the network interface, the processor configured to:
receive a request from a policy server via the network, the request containing one of the plurality of subscriber identifiers and a session identifier;
responsive to receiving the request, determine whether the request includes any of the counter identifiers;
when the request does not include any of the counter identifiers, determine whether the one of the records corresponding to the one of the subscriber identifiers contains any counter values, and in response:
when the one of the records includes at least one counter value, establish a communications session with the policy server and transmit the at least one counter value to the policy server; and when the one of the records does not include any counter values, transmit an error message to the policy server without establishing a communications session with the policy server; the error message including a re-trigger parameter for causing the policy server to send a further request.

20. The charging server of claim 19, the re-trigger parameter including at least one of a time period and a network event.

* * * * *